United States Patent [19]

Algar

[11] Patent Number: 5,614,006
[45] Date of Patent: Mar. 25, 1997

[54] ANTI-FOULING COMPOSITION

[75] Inventor: Brian Algar, Southampton, United Kingdom

[73] Assignee: Borden (UK) Limited, Southampton, United Kingdom

[21] Appl. No.: 492,113

[22] PCT Filed: Feb. 10, 1994

[86] PCT No.: PCT/GB94/00262

§ 371 Date: Sep. 20, 1995

§ 102(e) Date: Sep. 20, 1995

[87] PCT Pub. No.: WO94/19415

PCT Pub. Date: Sep. 1, 1995

[30] Foreign Application Priority Data

Feb. 25, 1993 [GB] United Kingdom ............... 9303798

[51] Int. Cl.⁶ ........................................ C09D 5/16
[52] U.S. Cl. ................. 106/18.31; 424/602; 424/604; 427/385.5; 427/386; 422/6; 523/122; 523/177
[58] Field of Search .............. 106/18.31; 424/604, 424/602; 523/122, 177; 427/386, 385.5; 264/299, 331.15, 331.18, 331.19; 422/6

[56] References Cited

U.S. PATENT DOCUMENTS 4,042,402  8/1977  Drake et al. .................. 106/18.29

FOREIGN PATENT DOCUMENTS 0013077  7/1980  European Pat. Off. ..
1511381  5/1978  United Kingdom .

Primary Examiner—Anthony Green
Attorney, Agent, or Firm—Watson Cole Stevens Davis, P.L.L.C.

[57] ABSTRACT

An anti-fouling composition for preventing or controlling the growth of aquatic or marine organisms comprising particles of a water-soluble glass dispersed in or suspended in a hardened liquid resin composition. The water-soluble glass contains phosphorous pentoxide in an amount of 58–66% by weight and copper oxide in an amount of 8–30% by weight of the glass. The composition may be coated onto a surface intended to be exposed to, or submerged in, an aqueous environment or may be formed, by molding or casting, into an article which may be submerged in fresh or sea water.

10 Claims, No Drawings

ANTI-FOULING COMPOSITION

The present invention relates to an anti-fouling composition. More particularly, it relates to a hardenable composition which contains particles of a water-soluble glass composition which particles dissolve slowly on contact with water or an aqueous solution thereby releasing a toxic chemical species therein.

Aquatic and marine organisms will grow on or attach themselves to any suitable surface which is exposed for an extended time to the aqueous environment in which they live. The bottoms of boats and ships are particularly prone to this problem since algae, seaweed and barnacles that grow there impede motion through the water by increased drag. Problems are also experienced at submerged water inlets to power stations where aquatic life forms, such as mussels, thrive and, thus, cause blockage of the inlets.

One method of preventing or reducing fouling of submerged surfaces is to provide a means of releasing copper II ions, which are toxic to the aquatic and marine life-forms that cause the problem, at a low level from a coating applied to the surface to be treated. This has conventionally been carried out by the incorporation of cuprous oxide into a paint formulation which is applied to the surface of the substrate to be treated. Such a means of providing copper ions into the aqueous environment relies on the intrinsic solubility of the cuprous oxide and the porosity of the paint to give some degree of controlled release. Unfortunately, this is not an efficient system since the release of copper is high initially and falls off with time. In order to overcome such a problem, the coating compositions are overloaded with cuprous oxide in order to ensure that sufficient copper is still being released at the end of the lifetime of the coating applied to the substrate. This practice not only is wasteful of the cuprous oxide but also risks causing damage to other forms of life in the aqueous environment.

GB 1,511,381 discloses an anti-fouling paint or coating which comprises a powdered glass composition dispersed in a resin vehicle. The glass composition used is slowly water-soluble and includes a glass forming oxide, such as phosphorus pentoxide or boric oxide, one or more oxides whose water-soluble ions are toxic to marine or aquatic life and one or more glass modifying oxides which affect the rate at which the glass is dissolved and the toxic ions are released. Although the use of the glass composition, according to GB 1,511,381, allows greater control over the rate of release our observations are that the active lifetime of the paint is far shorter than would have been predicted from the measured glass solubility. We have found that when a soluble phosphate glass dissolves in a limited amount of liquid such that the concentration of dissolution products of the glass builds up then the rate of dissolution of the glass varies as the concentration of the dissolution products changes. Depending on the composition of the glass it has been found that the rate of dissolution may increase or reduce as the concentration of dissolution products increases. There are also some glasses which, after an initial increase in rate, will reach a plateau after which the rate of dissolution changes either not at all or only slowly with increase in dissolution products.

The situation of a glass held in a paint/coating matrix is equivalent to the glass dissolving in a very small amount of liquid. Therefore, the preferred formulation of glass would be such as to produce products of dissolution which do not alter the rate of dissolution of the glass. If a constant rate of release of copper is to be achieved then the rate of dissolution of the glass must be substantially constant.

We have discovered that phosphate glasses within certain compositional limitations dissolve at substantially constant rates. When these are used in cast shapes or coatings on substrates exposed to an aqueous environment they are found to furnish toxic copper ions into the aqueous environment at a substantially uniform rate. The use of such glasses in anti-fouling coating compositions extends the active lifetime of coatings applied to substrate surfaces and overcomes environmental problems that arise from the use of prior art anti-fouling compositions.

Accordingly, the present invention provides an anti-fouling composition comprising particles of a water-soluble glass dispersed or suspended in a hardenable liquid resin composition wherein the water-soluble glass includes phosphorus pentoxide and copper oxide characterised in that the water-soluble glass has a phosphorus pentoxide content in the range of from 58 to 66% by weight of the glass and has a copper oxide content in the range of from 8 to 30% by weight of the glass.

The present invention also provides a method of treating a surface expected to be exposed to an aqueous environment to prevent fouling by the growth of aquatic or marine organisms thereon which comprises applying to the surface a layer of a composition of the present invention and allowing or causing the layer to harden.

Typically, the anti-fouling composition of the present invention is a paint or varnish which may be applied to a substrate surface using a brush or a roller or by spraying. The composition contains a resin vehicle which is liquid but which dries or hardens after it is applied to the substrate surface. The resin may be one that when applied as a film or layer to a substrate sets on exposure to the air or may be one that cures in the presence of a curing agent or when exposed to curing conditions, such as elevated temperature. Typical examples of resins suitable for use in the present invention are acrylic resins, polyurethane resins and epoxy resins. It is also within the scope of the present invention to produce moulded or cast articles from the composition which may be submerged in an aqueous environment to provide and maintain therein an effective concentration of toxic ions for controlling the growth of organisms therein.

In accordance with the present invention, in order to achieve a substantially constant dissolution rate, the phosphate glass has a $P_2O_5$ content in the range of from 58 to 66 wt % (corresponding to the range of from 40 to 48 mol %). At $P_2O_5$ contents below 58 wt %, the phosphate glass will initially dissolve in an aqueous medium but subsequent dissolution therein is hindered or even prevented by the formation on the glass surface of an insoluble deposit. The deposition of an insoluble film on the phosphate glass surface stops or becomes negligible at a $P_2O_5$ content of 58 wt %. For phosphate glasses having a $P_2O_5$ content above 66 wt % the rate of change of solubility with composition becomes too rapid to make control of the glass composition acceptable for a production process.

The content of CuO in the phosphate glass used in the present invention is in the range of from 8 to 30 wt % (corresponding to the range of from 10 to 40 mol %). When the copper containing phosphate glass dissolves in an aqueous environment copper ions, which are toxic to aquatic and marine organisms that cause fouling problems, are released into the water. The CuO content of the glass should not be less than 8 wt % since an effective rate of release of copper ions is difficult to achieve. At CuO contents above 30 wt % the phosphate glass cannot be produced without the risk that crystallisation will occur which leads to non-uniform dissolution rates.

The glass compositions will preferably contain other oxides which modify the dissolution performance of the phosphate glass and/or aid the production of the phosphate glass. A typical phosphate glass which can be used in the present invention has oxide contents as follows:

| | |
|---|---|
| $P_2O_5$ | 58 to 66 wt % |
| CuO | 8 to 30 wt % |
| $R_2O$ | 0 to 20 wt % (R = Na, K or Li) |
| MO | 0 to 15 wt % (M = Ca, Mg or Zn) |
| $T_2O_3$ | 0 to 12 wt % (T = B, Al or Fe) |

The oxides $R_2O$ (where R is Na, K or Li) are preferably incorporated into the glass composition to act as glass formers with the $P_2O_5$ to produce alkali metal polyphosphates. $R_2O$ contents greater than 20 wt % are not preferred since they make it difficult to form a glass with a sufficiently slow rate of dissolution as to be acceptable for use in the present invention. Preferably, the alkali metal in $R_2O$ is sodium for reasons of availability and, therefore, cost.

The oxides MO (where M is Ca, Mg or Zn) and $T_2O_3$ (where T is B, Al or Fe) are known to modify the solubility characteristics of the phosphate glass, i.e., they affect the rate at which the glass dissolves in an aqueous environment and the rate at which the toxic copper ions are released. A content of MO greater than 15 wt % and a content of $T_2O_3$ greater than 12 wt % are not preferred since contents in excess of these tend to make it difficult to produce a glass without crystallisation occurring which would lead to materials having non-uniform dissolution rates in water.

The glass composition may also contain a small amount of one or more other substances which, when in contact with an aqueous environment, release toxic or biocidally-active species therein. For instance, the phosphate glass may contain $Ag_2O$ (in an amount of up to 12% by weight) which would furnish toxic silver ions to improve the toxic effect of the copper towards aquatic and marine organisms responsible for fouling submerged surfaces.

According to a preferred embodiment, the anti-fouling coating composition of the present invention contains a phosphate glass having a composition comprising from 60 to 64 wt % $P_2O_5$, from 5 to 12 wt % $Na_2O$, from 21 to 27 wt % CuO, and from 3 to 8 wt % MgO.

The glasses used in the present invention may be formed by fusing together the dry oxides, and/or carbonates in a furnace according to methods known in the art. The glasses, once formed, are crushed and/or ground to form powder or particles. The particle size of the crushed and/or ground glass will depend on the intended application of the anti-fouling composition. For instance, in the case where the glass particles are incorporated into a mould or cast article, for example a panel cast from a composition comprising a castable polyurethane resin and the particulate water-soluble glass, the particles may typically have a size in the range of from 75 to 150 µm. However, if a sprayable coating composition is required then the particulate glass will typically have a size of less than 100 µm. If a paint formulation is required to give a smooth finish then the glass particles used would typically have a size of less than 10 µm.

Experimental

Glasses were melted using standard glass making raw materials such as copper oxide, copper pyrophosphate, sodium carbonate, sodium phosphate, calcium carbonate and magnesium oxide. The melts were carried out in the range of from 900° to 1200° C., with melting times of 1 to 2 hours for a 1 kg batch, in platinum melting vessels. The use of such vessels ensured that no extraneous material was incorporated into the glass during melting as would have been the case using refractory melting vessels. The incorporation of corrosion products from refractory such as alumina, silica or zirconia would have modified the dissolution rates of the glasses in an uncontrollable manner.

The glass was cast as a plate and annealed to remove residual stress. The plate was then cut up into small pieces of about 2 g. A piece of this glass was suspended in a mesh bag in 15 ml of deionised water contained in a small glass bottle. The bottle was closed to prevent evaporation during testing. The samples were normally tested at 80° C. to accelerate the dissolution. However, due to its fast rate of dissolution, sample 5 in Table 2 was tested at 40° C. Samples were weighed prior to testing and after various periods of time, usually 24 hours. The dissolution rate is reported as milligrams lost per centimeter squared of surface area per hour ($mg/cm^2/hr$). A note was also made of the surface condition of the glass piece, as to the formation of a coating deposit on the surface.

This method of dissolution testing is intended to simulate the effect of a particle of soluble glass trapped within a paint matrix. In this situation the glass would dissolve surrounded by a high concentration of its own dissolution products. The only way these products of dissolution have of escaping being by diffusion through the paint layer.

Results

The results are reported in Tables 1 and 2. Table 1 gives results for glass compositions which are not suitable for use in the present invention.

At the lower $P_2O_5$ levels it can be seen that after an initial increase in dissolution rate there is then a reduction in rate and sometimes even a stop in the dissolution. This is due to the formation of insoluble coatings which firmly attach to the surface of the glass and prevent removal of dissolution products from the glass surface. As the $P_2O_5$ level increases this effect diminishes and when the $P_2O_5$ level is up to 58 wt % the coating effect is minimal and the glass gives an acceptable long term dissolution profile.

The results in Table 2 are for glasses which are suitable for use in the present invention. With these glasses no insoluble coating is found and the dissolution rate is substantially constant throughout the lifetime of the glass.

TABLE 1

| | 1 | | 2 | | 3 | | 4 | |
|---|---|---|---|---|---|---|---|---|
| | Wt % | Mol % | Wt % | Mol % | Wt % | Mol % | Wt % | Mol % |
| $P_2O_5$ | 54.59 | (35) | 54.98 | (35) | 56.99 | (38) | 58.01 | (38) |
| $Na_2O$ | 15.53 | (22.8) | 13.58 | (19.8) | 12.30 | (18.8) | 11.87 | (17.8) |
| CuO | 22.71 | (26) | 22.88 | (26.0) | 25.17 | (30.0) | 22.23 | (26.0) |
| MgO | 7.17 | (16.2) | 8.56 | (19.2) | 5.61 | (13.2) | 7.89 | (18.2) |

TABLE 1-continued

| TIME IN HRS | DISSOLUTION RATE - mg/cm$^2$/hr | | | |
|---|---|---|---|---|
| 4 | 0.12 | | | |
| 23 | 0.09 | | | |
| 24 | | 0 | 0.08 | 0.42 |
| 48 | 0.17 | 0.02 | 0.38 | 0.62 |
| 72 | 0.41 | 0.03 | 0.46 | 0.89 |
| 96 | 0.72 | 0.25 | 0.43 | 0.81 |
| 120 | 0 (coated) | 0.51 | 0.69 | 0.93 |
| 144 | | 0.49 | 0.85 | 0.70 |
| 168 | | 0.63 | 1.33 | 0.80 |
| 192 | | 0.61 | 0.22 | 0.97 |
| 216 | | 0.32 | 1.04 | 0.59 |
| 240 | | 0.05 | 0.70 | 0.50 |
| 264 | | | 0.82 | 0.58 |
| 288 | | 0.04 | 0.58 | 0.49 |
| 312 | | 0.11 | 0.45 | 0.24 |
| 336 | | 0.14 | 0.43 | 0.20 |
| 360 | | | 0.59 | 0.29 |
| 384 | | | 0.57 | 0.24 |

TABLE 2

| | 5 | | 6 | | 7 | | 8 | | 9 | |
|---|---|---|---|---|---|---|---|---|---|---|
| | Wt % | Mol % | Wt % | Mol % | Wt % | Mol % | Wt % | Mol % | Wt % | Mol % |
| P$_2$O$_5$ | 60.33 | (42) | 60.71 | (42) | 61.43 | (42) | 61.85 | (42) | 63.07 | (45.3) |
| Na$_2$O | 9.91 | (15.8) | 5.87 | (9.3) | 11.37 | (17.8) | 9.52 | (14.8) | 6.38 | (10.5) |
| CuO | 24.15 | (30) | 24.30 | (30) | 21.30 | (26.0) | 21.45 | (26.0) | 26.52 | (34) |
| MgO | 3.34 | 8.2) | 3.98 | (9.7) | 5.89 | (14.2) | 7.19 | (17.2) | 4.03 | (10.2) |
| CaO | 2.27 | (4) | 5.14 | (9) | — | (—) | — | (—) | — | (—) |

| TIME IN HRS | DISSOLUTION RATE - mg/cm$^2$/hr | | | | |
|---|---|---|---|---|---|
| 24 | 0.36 | 0.29 | 3.33 | 1.12 | 0.21 |
| 48 | 1.20 | 0.70 | 2.18 | 1.29 | 0.17 |
| 72 | 1.13 | 0.62 | 2.55 | 1.49 | 0.31 |
| 96 | 1.22 | 1.76 | 3.48 | 2.26 | 0.21 |
| 120 | 0.96 | 0.65 | 3.99 | 2.80 | 0 18 |
| 144 | 0.97 | 0.73 | 3.32 | 2.56 | 0.21 |
| 168 | 1.10 | 0.75 | | 2.51 | — |
| 192 | 1.52 | 0.98 | | 2.34 | 0.24 |
| 216 | 1.40 | 0.74 | | | 0.24 |
| 240 | 1.32 | 0.84 | | | 0.26 |
| 264 | | — | | | |
| 288 | | 0.74 | | | |
| 312 | | 0.66 | | | |
| 336 | | 0.67 | | | |
| 360 | | | | | |
| 384 | | | | | |

EXAMPLE 1

Glass of composition CuO 34%, P$_2$O$_5$ 45.3%, Na$_2$O 18.5% and MgO 2.1% (mol %) was melted at 1200° C. and cast as cullet. The cullet was roughly broken up and crushed using a cross beater mill. The resultant product was sieved and the fraction 75–150 microns was collected.

The glass particles were mixed with a castable polyurethane at 35% by weight of glass. Panels were cast and as the urethane cured the glass particles concentrated into the surface (first 5 mm) of the panel.

These panels were suspended from a rack, in the sea off the south coast of England. After six months the panels were inspected together with control panels of glass free polyurethane. The glass containing panels were free of fouling but the controls were covered in sea fouling matter. However, the glass containing panels were pale in colour and the glass appeared to have dissolved out of the panel. This was confirmed by electron microscopic analysis of sections of the panel when very little of the original glass was found.

EXAMPLE 2

Glass of composition CuO 34%, P$_2$O$_5$ 45.3%, Na$_2$O 10.5% and MgO 10.1% (mol %) was prepared as above and panels also prepared as above.

In this case the panels were suspended together with controls in the seas as before but also in Lake Erie where there is a serious problem of Zebra mussel infestation.

After 12, 24 and 36 months the panels were removed from the sea and the glass containing panels were found to be free of fouling. After 6 and 18 months the panels were removed from Lake Erie and the glass containing panels were found to be free of Zebra mussels.

In this case after 36 months sea trials electron microscopy showed that substantial quantities of glass remained in the polyurethane.

I claim:

1. An anti-fouling composition comprising particles of a water-soluble glass dispersed or suspended in a hardenable liquid resin wherein the water-soluble glass includes phosphorus pentoxide having a content in the range of from 58 to 66% by weight of the glass, copper oxide at a content in the range of from 8 to 30% by weight of the glass and up to 15% by weight of the glass of a metal oxide selected from the group consisting of CaO, MgO, ZnO and mixtures thereof.

2. A composition according to claim 1, wherein the water-soluble glass further contains up to 20% by weight based on the weight of the glass in an alkali metal oxide selected from the group consisting of $Na_2O$, $K_2O$, $Li_2O$ and mixtures thereof.

3. A composition according to claim 1, wherein the water-soluble glass further contains up to 12% by weight of the glass of an oxide selected from the group consisting of $B_2O_3$, $Al_2O_3$, $Fe_2O_3$ and mixtures thereof.

4. A composition according to claim 1, wherein the water-soluble glass further contains up to 12% by weight of the glass of $Ag_2O$.

5. A composition according to claim 1, wherein the water-soluble glass comprises from 60 to 64 wt % $P_2O_5$, from 5 to 12 wt % $Na_2O$, from 21 to 27 wt % CuO and from 3 to 8 wt % MgO.

6. A composition according to claim 1, wherein the hardenable liquid resin is selected from the group consisting of acrylic resin, polyurethane resin and epoxy resin.

7. A method of treating a surface exposed to an aqueous environment to prevent the fouling by the growth of aquatic or marine organisms thereon which comprises applying to the surface a layer of a composition of claim 1 and allowing or causing the layer to harden.

8. An antifouling paint composition comprising particles of a water-soluble glass dispersed or suspended in a hardenable liquid resin wherein the water-soluble glass includes phosphorus pentoxide at a content in the range of from 58 to 66% by weight of the glass, copper oxide at a content in the range of from 8 to 30% by weight of the glass and up to 15% by weight of the glass of a metal oxide selected from the group consisting of CaO, MgO, ZnO and mixtures thereof, the said particles of water-soluble glass having a particle size of less than 100 μm.

9. A molded antifouling article formed by placing in a mold a composition comprising a mixture of a hardenable liquid resin and particles of a water-soluble glass wherein the water-soluble glass includes phosphorus pentoxide at a content in the range of from 58 to 66% by weight of the glass, copper oxide at a content in the range of from 8 to 30% by weight of the glass and up to 15% by weight of the glass of a metal oxide selected from the group consisting of CaO, MgO, ZnO and mixtures thereof; the said particles having a particle size in the range of from 75 to 150 μm, allowing the resin to harden in the mold and then removing the hardened resin article from the mold.

10. A method of treating an aqueous environment to prevent or control the growth therein of aquatic or marine organisms comprising submerging one or more articles according to claim 9 in the said aqueous environment.

* * * * *